US010635367B2

(12) United States Patent
Nakatani

(10) Patent No.: US 10,635,367 B2
(45) Date of Patent: Apr. 28, 2020

(54) SERVER APPARATUS, INFORMATION PROCESSING SYSTEM, AND IMAGE FORMING APPARATUS

(71) Applicant: KYOCERA DOCUMENT SOLUTIONS INC., Osaka (JP)

(72) Inventor: Ryusuke Nakatani, Osaka (JP)

(73) Assignee: KYOCERA DOCUMENTS SOLUTIONS INC., Osaka (JP)

( * ) Notice: Subject to any disclaimer, the term of this patent is extended or adjusted under 35 U.S.C. 154(b) by 0 days.

(21) Appl. No.: 16/480,946

(22) PCT Filed: Nov. 1, 2017

(86) PCT No.: PCT/JP2017/039511
§ 371 (c)(1),
(2) Date: Jul. 25, 2019

(87) PCT Pub. No.: WO2018/142695
PCT Pub. Date: Aug. 9, 2018

(65) Prior Publication Data
US 2019/0391774 A1 Dec. 26, 2019

(30) Foreign Application Priority Data
Feb. 1, 2017 (JP) .................................. 2017-016423

(51) Int. Cl.
*G06F 3/12* (2006.01)
(52) U.S. Cl.
CPC .......... *G06F 3/1248* (2013.01); *G06F 3/1212* (2013.01); *G06F 3/1215* (2013.01); *G06F 3/1288* (2013.01); *G06F 3/1298* (2013.01)

(58) Field of Classification Search
None
See application file for complete search history.

(56) References Cited

U.S. PATENT DOCUMENTS 8,125,664 B2 * 2/2012 Tomita ............... H04N 1/00204
358/1.13
8,630,010 B2 * 1/2014 Iida ...................... G06K 15/005
358/1.13

(Continued)

FOREIGN PATENT DOCUMENTS

JP 1997185471 A 7/1997
JP 2006318205 A 11/2006

(Continued)

Primary Examiner — Dung D Tran
(74) Attorney, Agent, or Firm — Li & Cai Intellectual Property (USA) Office

(57) ABSTRACT

A server apparatus includes: a storage device configured to store a resolution table, the resolution table being configured to record a plurality of image forming apparatuses having different resolutions, the resolutions of the image forming apparatuses respectively, and information processing abilities of the image forming apparatuses respectively, in association with each other; and a processor configured to operate as a printable data obtaining unit, an intermediate data creating unit, an image forming apparatus selecting unit, an intermediate data supplying unit, a rasterized data obtaining unit, a pull-print receiving unit, a resolution determining unit, and a pull-print data supplying unit.

10 Claims, 9 Drawing Sheets

(56) References Cited

U.S. PATENT DOCUMENTS

| | | | | |
|---|---|---|---|---|
| 8,773,699 | B2* | 7/2014 | Suzuki | G06K 15/002 |
| | | | | 358/1.13 |
| 8,854,653 | B2* | 10/2014 | Tomita | G06F 3/1214 |
| | | | | 358/1.13 |
| 10,133,521 | B2* | 11/2018 | Nakatani | G06F 3/1288 |
| 2006/0256361 | A1 | 11/2006 | Hayase et al. | |
| 2008/0307113 | A1 | 12/2008 | Suga | |
| 2012/0081731 | A1* | 4/2012 | Suzuki | G06F 3/1205 |
| | | | | 358/1.13 |
| 2012/0081740 | A1* | 4/2012 | Takagi | G06F 3/1205 |
| | | | | 358/1.15 |
| 2013/0145183 | A1 | 6/2013 | Wada | |
| 2017/0295285 | A1* | 10/2017 | Yoshida | H04N 1/00244 |
| 2018/0288245 | A1* | 10/2018 | Oguma | G06F 3/1206 |

FOREIGN PATENT DOCUMENTS

| | | |
|---|---|---|
| JP | 2008305018 A | 12/2008 |
| JP | 2013118599 A | 6/2013 |
| JP | 2015114769 A | 6/2015 |

* cited by examiner

SERVER APPARATUS, INFORMATION PROCESSING SYSTEM, AND IMAGE FORMING APPARATUS

BACKGROUND OF THE INVENTION

1. Field of the Invention

The present disclosure relates to a server apparatus configured to supply data, which is used to form an image, to an image forming apparatus. The present disclosure further relates to an information processing system. The present disclosure further relates to an image forming apparatus capable of obtaining the data from the server apparatus and forming the image.

2. Description of Related Art

There is known an image forming apparatus capable of obtaining data from a server apparatus and forming an image (so-called pull-printing) (for example, see Patent Literatures 1 and 2).

CITATION LIST (Patent Literature)
Patent Literature 1: Japanese Patent Application Laid-open No. 2009-194563
Patent Literature 2: Japanese Patent Application Laid-open No. 2004-086692

SUMMARY OF THE INVENTION

Technical Problem

It is desirable to further reduce time to obtain data from a server apparatus and form an image by an image forming apparatus.

In view of the aforementioned circumstances, it is an object of the present disclosure to provide a server apparatus, an information processing system, and an image forming apparatus capable of further reducing time to obtain data from the server apparatus and form an image by the image forming apparatus.

Solution to Problem

According to an embodiment of the present disclosure, there is provided a server apparatus, including:
 a storage device configured to store a resolution table, the resolution table being configured to record a plurality of image forming apparatuses having different resolutions, the resolutions of the image forming apparatuses respectively, and information processing abilities of the image forming apparatuses respectively, in association with each other;
 a memory configured to store an information processing program; and
 a processor configured to execute the information processing program,
 the processor being configured to execute the information processing program to operate as
  a printable data obtaining unit configured to obtain printable data from a terminal device,
  an intermediate data creating unit configured to create intermediate data on a basis of the printable data, the intermediate data being independent of resolution,
  an image forming apparatus selecting unit configured to select one image forming apparatus having each of the different resolutions on a basis of priority from the plurality of image forming apparatuses recorded in the resolution table,
  an intermediate data supplying unit configured to supply the intermediate data to the plurality of image forming apparatuses selected,
  a rasterized data obtaining unit configured to obtain a plurality of rasterized data depending on the different resolutions respectively, the plurality of rasterized data being created by the plurality of image forming apparatuses on a basis of the intermediate data,
  a pull-print receiving unit configured to receive a pull-print request from a pull-print image forming apparatus and obtain a pull-print resolution, the pull-print image forming apparatus being an image forming apparatus that executes pull-printing, the pull-print resolution being a resolution of the pull-print image forming apparatus,
  a resolution determining unit configured to determine whether or not the resolution table records a resolution that is same as the pull-print resolution, and
  a pull-print data supplying unit configured to supply rasterized data depending on the resolution that is same as the pull-print resolution to the pull-print image forming apparatus.

According to the embodiment, the intermediate data supplying unit is configured to supply the intermediate data to the plurality of image forming apparatuses selected. The rasterized data obtaining unit is configured to obtain a plurality of rasterized data depending on the different resolutions respectively, the plurality of rasterized data being created by the plurality of image forming apparatuses on a basis of the intermediate data. As a result, as soon as the pull-print receiving unit receives the pull-print request from the pull-print image forming apparatus, the pull-print receiving unit is capable of immediately supplying the rasterized data depending on the pull-print resolution to the pull-print image forming apparatus. As a result, the pull-print image forming apparatus only has to print the rasterized data obtained from the server apparatus. So it is possible to omit the step of creating rasterized data. It is possible to execute pull-printing in a shorter time.

According to an embodiment of the present disclosure, there is provided an information processing system, including:
 a plurality of image forming apparatuses having different resolutions; and
 a server apparatus,
 the server apparatus including
 a storage device configured to store a resolution table, the resolution table being configured to record the plurality of image forming apparatuses, the resolutions of the image forming apparatuses respectively, and information processing abilities of the image forming apparatuses respectively, in association with each other,
 a memory configured to store an information processing program, and
 a processor configured to execute the information processing program,
 the processor being configured to execute the information processing program to operate as
  a printable data obtaining unit configured to obtain printable data from a terminal device, an intermediate data creating unit configured to create intermediate data on a basis of the printable data, the intermediate data being independent of resolution, an image forming apparatus selecting unit configured to select one image forming apparatus having each of the different resolutions on a basis of priority from the plurality of image forming apparatuses recorded in the resolution table, an intermediate data supplying unit configured to supply the intermediate data to the plurality of image forming apparatuses selected, a rasterized data obtaining unit configured to obtain a plurality of rasterized data depending on the different resolutions respectively, the plurality of rasterized data being created by the plurality of image forming apparatuses on a basis of the intermediate data, a pull-print receiving unit configured to receive a pull-print request from a pull-print image forming apparatus and obtain a pull-print resolution, the pull-print image forming apparatus being an image forming apparatus that executes pull-printing, the pull-print resolution being a resolution of the pull-print image forming apparatus, a resolution determining unit configured to determine whether or not the resolution table records a resolution that is same as the pull-print resolution, and a pull-print data supplying unit configured to supply rasterized data depending on the resolution that is same as the pull-print resolution to the pull-print image forming apparatus.

According to an embodiment of the present disclosure, there is provided an image forming apparatus, including:

a memory configured to store an information processing program; and a processor configured to execute the information processing program, the processor being configured to execute the information processing program to operate as an intermediate data obtaining unit configured to obtain intermediate data from a server apparatus, a rasterized data creating unit configured to create rasterized data on a basis of the intermediate data, the rasterized data depending on the resolution, and a rasterized data supplying unit configured to supply the rasterized data to the server apparatus, the server apparatus including a storage device configured to store a resolution table, the resolution table being configured to record a plurality of image forming apparatuses having different resolutions, the resolutions of the image forming apparatuses respectively, and information processing abilities of the image forming apparatuses respectively, in association with each other, a printable data obtaining unit configured to obtain printable data from a terminal device, an intermediate data creating unit configured to create intermediate data on a basis of the printable data, the intermediate data being independent of resolution, an image forming apparatus selecting unit configured to select one image forming apparatus having each of the different resolutions on a basis of priority from the plurality of image forming apparatuses recorded in the resolution table, an intermediate data supplying unit configured to supply the intermediate data to the plurality of image forming apparatuses selected, a rasterized data obtaining unit configured to obtain a plurality of rasterized data depending on the different resolutions respectively, the plurality of rasterized data being created by the plurality of image forming apparatuses on a basis of the intermediate data, a pull-print receiving unit configured to receive a pull-print request from a pull-print image forming apparatus and obtain a pull-print resolution, the pull-print image forming apparatus being an image forming apparatus that executes pull-printing, the pull-print resolution being a resolution of the pull-print image forming apparatus, a resolution determining unit configured to determine whether or not the resolution table records a resolution that is same as the pull-print resolution, and a pull-print data supplying unit configured to supply rasterized data depending on the resolution that is same as the pull-print resolution to the pull-print image forming apparatus.

Advantageous Effects of Invention

According to the present disclosure, it is possible to further reduce time to obtain data from a server apparatus and form an image by an image forming apparatus.

Note that the effects described here are not necessarily limitations, but any effects described in the present disclosure may be obtained.

DETAILED DESCRIPTION OF THE PREFERRED EMBODIMENTS

Hereinafter, an embodiment of the present disclosure will be described with reference to the drawings.

1. Outline of Information Processing System

Figure 1:
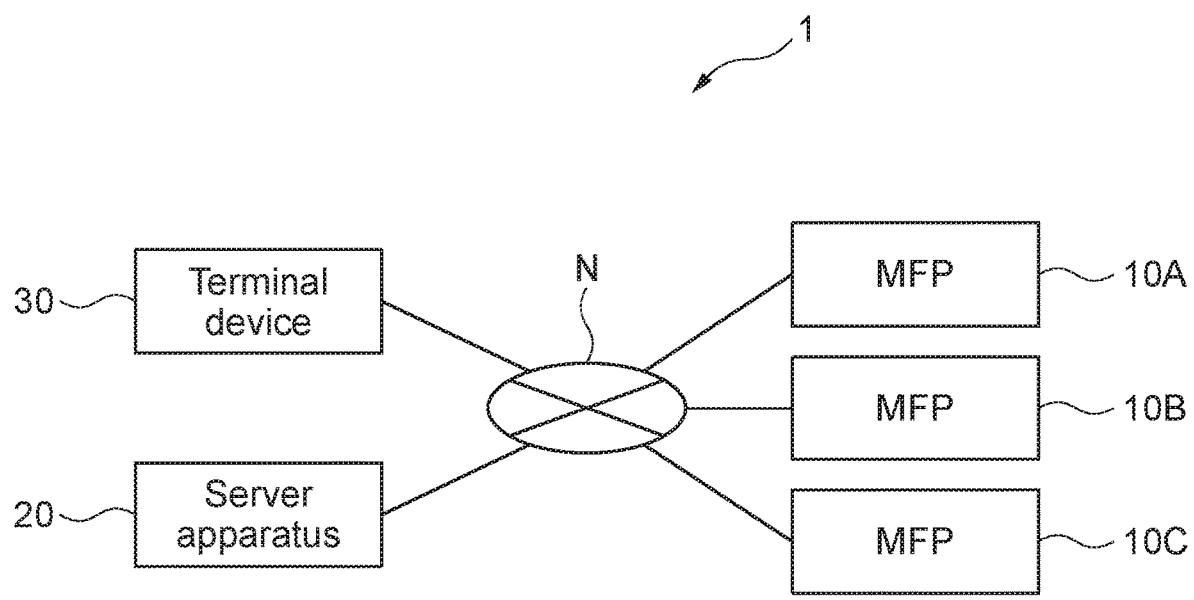
FIG. 1 An information processing system according to an embodiment of the present disclosure.

FIG. 1 shows an information processing system according to an embodiment of the present disclosure.

The information processing system 1 includes the plurality of image forming apparatuses (Multifunction Peripherals, hereinafter referred to as MFPs) 10A, 10B, and 10C . . . , the server apparatus 20, and the terminal device 30. The plurality of MFPs 10A, 10B, and 10C . . . and the server apparatus 20 are capable of communicating with each other via the network N. The network N is, for example, an intra-office LAN (Local Area Network).

In the present example described hereinafter, the information processing system 1 includes the three MFPs 10A, 10B, and 10C. The MFPs 10A, 10B, and 10C may have different models and specs, respectively. In the present example, the MFPs 10A, 10B, and 10C have different resolutions. In the following description, the three MFPs 10A, 10B, and 10C will be simply referred to as the MFP(s) 10 where it is not necessary to distinguish between them.

The terminal device 30 is an information processing apparatus such as a personal computer. The terminal device 30 is capable of communicating with at least the server apparatus 20 via a network or not via a network. In the present example, the terminal device 30 and the server apparatus 20 are capable of communicating with each other via the network N.

A user wants to print printable data, which is created by the terminal device 30, by using one of the MFPs 10 connected to the network N. The terminal device 30 is operated by the user, and supplies the printable data to the server apparatus 20. The user logs in to one of the MFPs 10. The MFP 10, to which the user logs in, obtains intermediate data or rasterized data, which is created on a basis of the printable data, from the server apparatus 20. The MFP 10 forms an image on a basis of the intermediate data or the rasterized data (so-called pull-printing).

Printable data is created by the terminal device 30 when the terminal device 30 executes a printer driver, and is described in a page description language. The printable data (strictly speaking, the header of a printable file that stores the printable data) describes a resolution, which is used to print the printable data.

Intermediate data is independent of a resolution. The intermediate data is created by the server apparatus 20 when the server apparatus 20 interprets (analyzes) printable data and converts the printable data. The intermediate data is data immediately before rasterized data, and is only used to create rasterized data. In other words, the intermediate data is data to which a resolution of an output image is yet to be reflected. The intermediate data also describes a resolution (which has a value that is the same as the resolution described in the printable data), which is used to print the intermediate data.

Rasterized data depending on a resolution is created by the MFP 10 by converting intermediate data. The rasterized data is data such as bitmap data to be actually output to a printer engine. In principle, the resolution of the rasterized data depends on the resolution described in the printable data and the intermediate data. Note that, if the resolution of the MFP 10 that creates rasterized data is smaller than the resolution described in the printable data and the intermediate data, the resolution of the rasterized data depends on the resolution of the MFP 10 that creates the rasterized data, inevitably.

2. Hardware Configuration of Image Forming Apparatus

Figure 2:
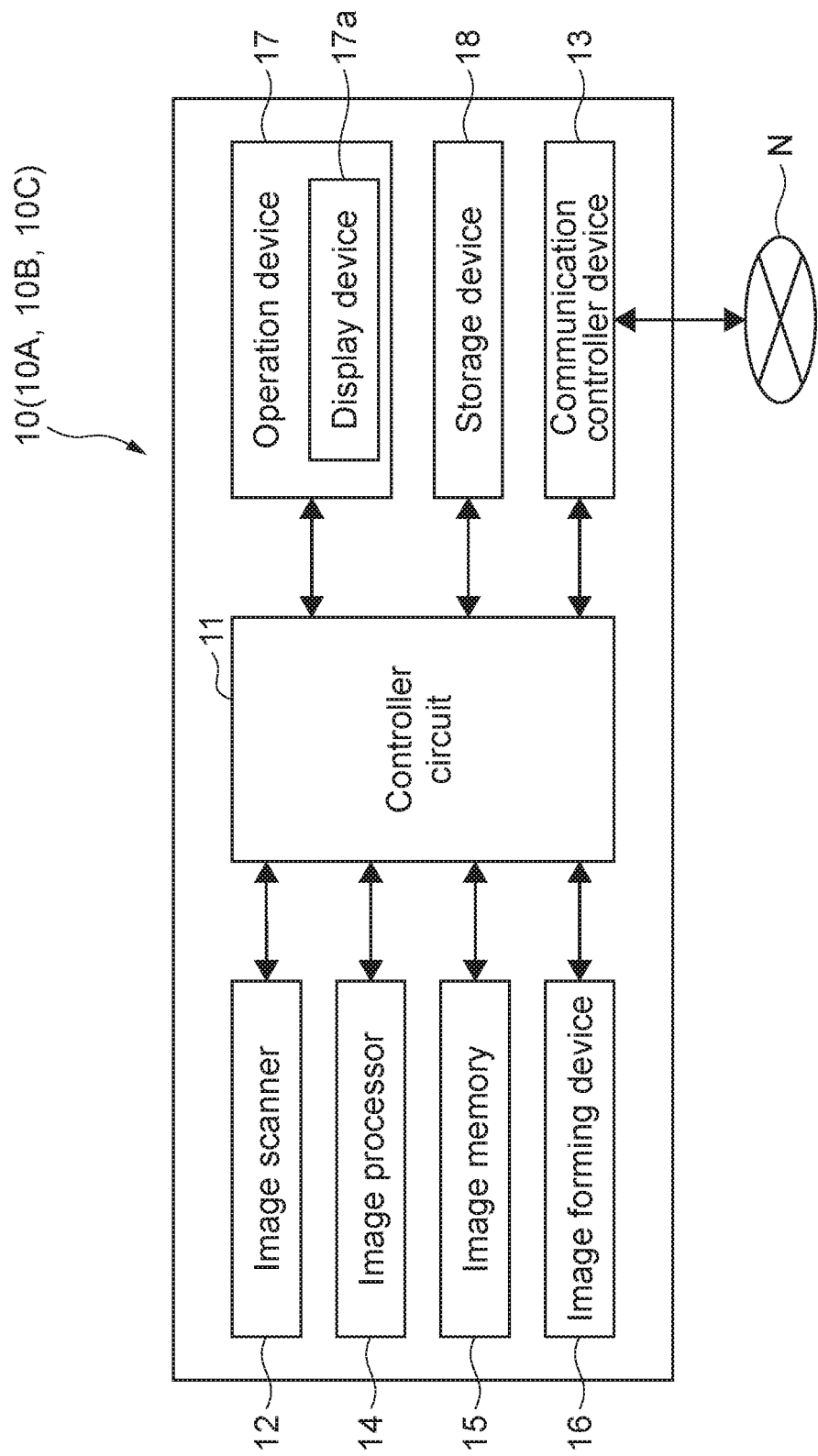
FIG. 2 A hardware configuration of an image forming apparatus.

FIG. 2 shows a hardware configuration of an image forming apparatus.

The MFP 10 includes the controller circuit 11. The controller circuit 11 includes a CPU (Central Processing Unit), a RAM (Random Access Memory), a ROM (Read Only Memory), dedicated hardware circuits, and the like and performs overall operational control of the MFP 10. A computer program that causes the MFP 10 to operate as the respective functional units (to be described later) is stored in a non-transitory computer readable recording medium such as a ROM.

The controller circuit 11 is connected to the image scanner 12, the image processor 14, the image memory 15, the image forming device 16, the operation device 17, the storage device 18, the communication controller device 13, and the like. The controller circuit 11 performs operational control of the respective devices connected thereto and sends/receives signals and data to/from those devices.

According to job execution instructions input by a user via the operation device 17 or a personal computer (not shown) connected to a network, the controller circuit 11 controls drive and processing of mechanisms requisite for executing operational control of functions such as a scanner function, a printing function, and a copy function.

The image scanner 12 reads an image from a document.

The image processing device 14 carries out image processing as necessary on image data of an image read by the image scanner 12. For example, the image processing device 14 carries out image processing such as shading correction for improving image quality after an image read by the image scanner 12 is formed.

The image memory 15 includes an area that temporarily stores data of a document image read by the image scanner 12 or data to be printed by the image forming device 16.

The image forming device 16 is a printer that forms an image on paper based on image data read by the image scanner 12, for example.

The operation device 17 includes a touch panel device and an operation key device that accept user's instructions on various operations and processing executable by the MFP 1. The touch panel device includes the display device 17a such as an LCD (Liquid Crystal Display) and an organic EL (Electroluminescence) display including a touch panel.

The communication controller device 13 is an interface used for connecting to the network N.

The storage device 18 is a large-volume storage device such as an HDD (Hard Disk Drive) that stores a document image read by the image scanner 12, and the like.

3. Hardware Configuration of Server Apparatus

Figure 3:
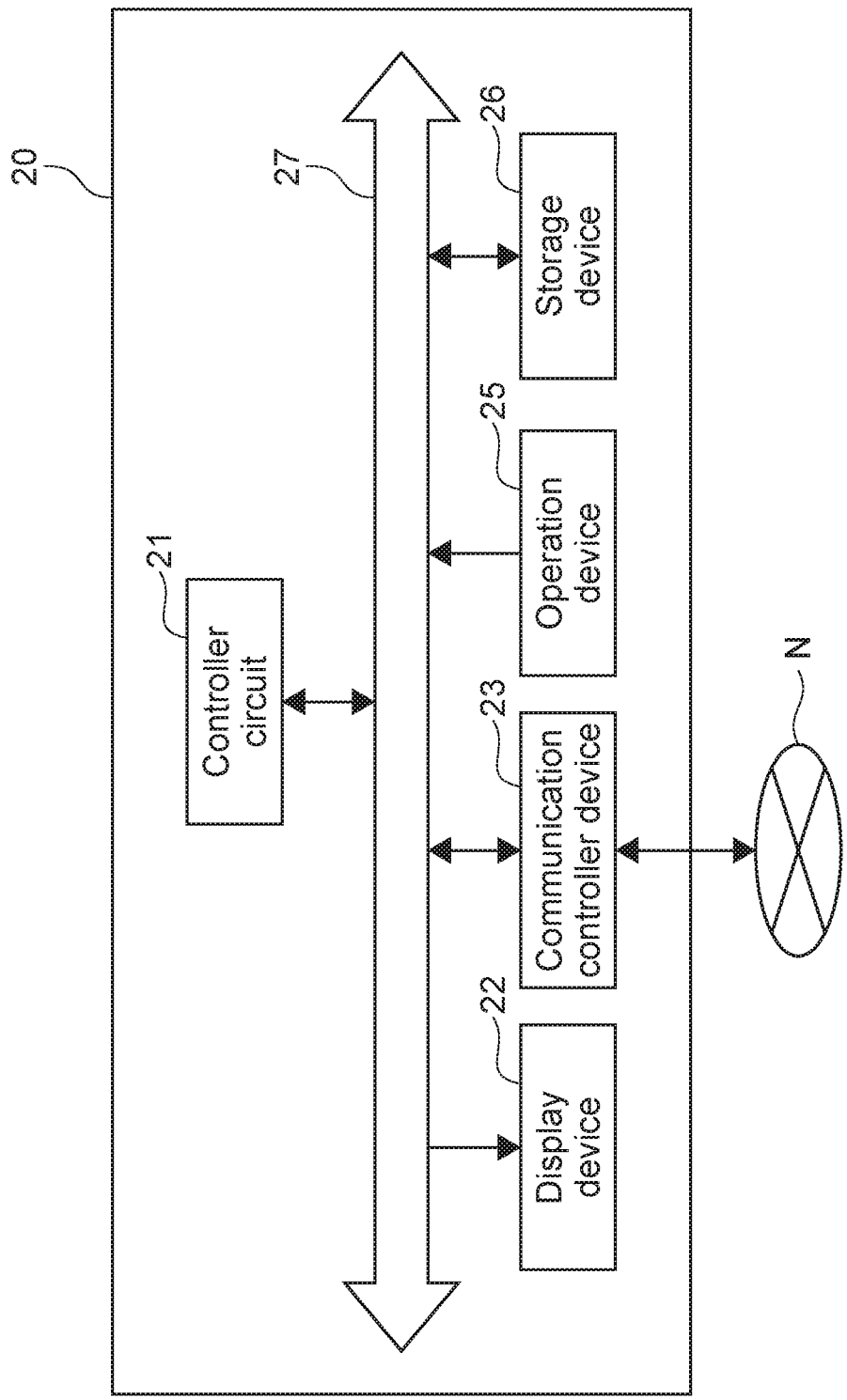
FIG. 3 A hardware configuration of a server apparatus.

FIG. 3 shows a hardware configuration of a server apparatus.

The server apparatus 20 includes a controller circuit 21, and a display device 22, a communication controller device 23, an operation device 25, and a storage device 26 that are connected to the controller circuit 21 via a bus 27.

The controller circuit 21 includes a CPU and the like. The CPU of the controller circuit 21 loads a program recorded in a ROM, which is an example of a non-transitory computer readable recording medium, in a RAM and executes the program. An example of a program is a printer driver. The controller circuit 21 loads the printer driver in the ROM, which is an example of a non-transitory computer readable recording medium, in the RAM and executes the printer driver to thereby drive an MFP connected via the network N.

The storage device 26 includes a ROM, a RAM, and a large-volume storage device such as an HDD. The ROM fixedly stores programs to be executed by the controller circuit 21, data, and the like. The programs stored in the ROM are loaded to the RAM.

The display device 22 includes an LCD, an organic EL display, or the like. The display device 22 carries out operational processing based on information received from the controller circuit 21 and displays generated image signals on a screen. The display device 22 may be an external display device.

The operation device 25 includes a keyboard, a mouse, and various switches. The operation device 25 detects user operations and outputs operation signals to the controller circuit 21.

The communication controller device 23 is an interface used for connecting to the network N.

4. Hardware Configuration of Terminal Device

The terminal device 30 is a typical information processing apparatus such as a personal computer, a tablet terminal, or a smartphone. A hardware configuration of the terminal device 30 is not shown in the drawings. A CPU of the terminal device 30 loads a program recorded in a ROM in a RAM and executes the program. The terminal device 30 supplies printable data to the server apparatus 20 via the network N.

5. Functional Configuration of Information Processing System

Figure 4:
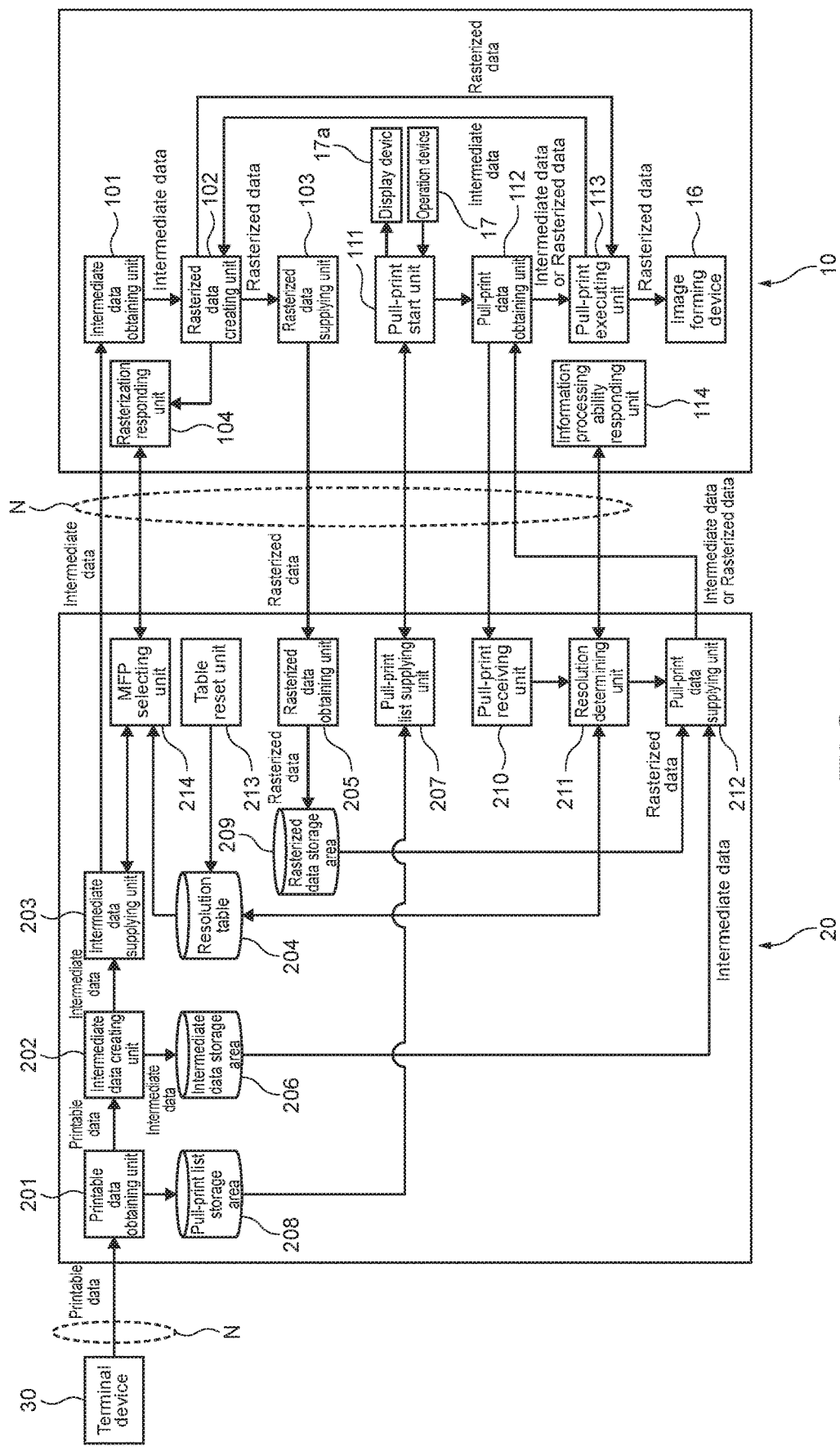
FIG. 4 A functional configuration of the information processing system.

FIG. 4 shows a functional configuration of the information processing system.

Hereinafter, an MFP that executes pull-printing will be referred to as "pull-print MFP". In the present example, the "pull-print MFP" is the MFP 10A, and will be referred to as the pull-print MFP 10A. Further, the resolution of the pull-print MFP 10A will be referred to as "pull-print resolution".

The server apparatus 20 loads an information processing program recorded in a ROM, which is an example of a non-transitory computer readable recording medium, in a RAM and executes the program to thereby operate as the printable data obtaining unit 201, the intermediate data creating unit 202, the MFP selecting unit 214, the intermediate data supplying unit 203, the rasterized data obtaining unit 205, the pull-print list supplying unit 207, the pull-print receiving unit 210, the resolution determining unit 211, the pull-print data supplying unit 212, and the table reset unit 213.

The server apparatus 20 includes, in a non-transitory computer readable recording medium, the resolution table 204, the intermediate data storage area 206, the pull-print list storage area 208, and the rasterized data storage area 209.

The MFP 10 loads an information processing program recorded in a ROM, which is an example of a non-transitory computer readable recording medium, in a RAM and executes the program to thereby operate as the intermediate data obtaining unit 101, the rasterization responding unit 104, the rasterized data creating unit 102, the rasterized data supplying unit 103, the pull-print start unit 111, the pull-print data obtaining unit 112, the pull-print executing unit 113, and the information processing ability responding unit 114.

The terminal device 30 supplies printable data to the server apparatus 20 via the network N.

The printable data obtaining unit 201 of the server apparatus 20 obtains printable data from the terminal device 30 via the network N. The printable data obtaining unit 201 records a list of identifier information (name, etc.) of printable data, as a list of pull-printable data, in the pull-print list storage area 208.

The intermediate data creating unit 202 of the server apparatus 20 interprets the printable data obtained from the terminal device 30, and creates intermediate data independent of a resolution. The intermediate data creating unit 202 records the created intermediate data in the intermediate data storage area 206.

The MFP selecting unit 214 of the server apparatus 20 selects one MFP 10 for each of different resolutions on a basis of priority from the MFPs 10A, 10B, and 10C (FIG. 4 shows only one MFP) recorded in the resolution table 204.

The rasterization responding unit 104 of the MFP 10 determines whether or not the rasterized data creating unit 102 is executing a job (print job, etc.) including creating rasterized data. If the rasterized data creating unit 102 is not executing a job including creating rasterized data, the rasterization responding unit 104 determines that it is possible to create rasterized data immediately. Meanwhile, if the rasterized data creating unit 102 is executing a job including creating rasterized data, the rasterization responding unit 104 determines that it is not possible to create rasterized data immediately. The rasterization responding unit 104 responds the determination result to the server apparatus 20 via the network N.

The intermediate data supplying unit 203 of the server apparatus 20 supplies intermediate data to the MFP 10 selected by the MFP selecting unit 214 via the network N, and requests the MFP 10 to create rasterized data on a basis of the intermediate data.

The intermediate data obtaining unit 101 of the MFP 10 obtains the intermediate data from the server apparatus 20 via the network N, and receives the request to create rasterized data on a basis of the intermediate data.

The rasterized data creating unit 102 of the MFP 10 creates rasterized data on a basis of the intermediate data obtained from the server apparatus 20, the rasterized data depending on the resolution of the MFP 10.

The rasterized data supplying unit 103 of the MFP 10 supplies the rasterized data created by the rasterized data creating unit 102 to the server apparatus 20 via the network N.

The rasterized data obtaining unit 205 of the server apparatus 20 obtains a plurality of rasterized data depending on the resolutions of the MFPs 10 from one MFP 10 for each of different resolutions recorded in the resolution table 204, via the network N. The rasterized data obtaining unit 205 records the rasterized data depending on the different resolutions obtained from the MFP 10 in the rasterized data storage area 209.

The pull-print start unit 111 of the pull-print MFP 10A sends a request for a list of pull-printable data to the server apparatus 20 via the network N.

The pull-print list supplying unit 207 of the server apparatus 20 receives the request for a list of pull-printable data from the pull-print MFP 10A via the network N. The pull-print list supplying unit 207 supplies the list of pull-printable data recorded in the pull-print list storage area 208 to the pull-print MFP 10A via the network N.

The pull-print start unit 111 of the pull-print MFP 10A obtains the list of pull-printable data from the server apparatus 20 via the network N. The pull-print start unit 111 selects identifier information of data-to-be-pull-printed, and informs the pull-print data obtaining unit 112 of the identifier information.

The pull-print data obtaining unit 112 of the pull-print MFP 10A informs the server apparatus 20 of the identifier information of the data-to-be-pull-printed and the pull-print resolution of the pull-print MFP 10A via the network N.

The pull-print receiving unit 210 of the server apparatus 20 receives the pull-print request from the pull-print MFP 10A via the network N, and thereby obtains the identifier information of the data-to-be-pull-printed and the pull-print resolution of the pull-print MFP 10A.

The pull-print data supplying unit 212 of the server apparatus 20 supplies rasterized data depending on the resolution that is the same as the resolution of the pull-print MFP 10A or intermediate data to the pull-print MFP 10A via the network N.

The pull-print data obtaining unit 112 of the pull-print MFP 10A obtains the rasterized data or the intermediate data from the server apparatus 20 via the network N.

The pull-print executing unit 113 of the pull-print MFP 10A outputs the rasterized data obtained from the server apparatus to the image forming device 16, and causes the image forming device 16 to print the rasterized data. Alternatively, the pull-print executing unit 113 causes the rasterized data creating unit 102 to create rasterized data on a basis of the intermediate data obtained from the server apparatus. The pull-print executing unit 113 outputs the rasterized data created by the rasterized data creating unit 102 to the image forming device 16, and causes the image forming device 16 to print the rasterized data.

The information processing ability responding unit 114 of the pull-print MFP 10A supplies the information processing ability of the pull-print MFP 10A to the server apparatus 20 via the network N.

The resolution determining unit 211 of the server apparatus 20 determines whether or not the resolution table 204 records the pull-print MFP 10A. If the resolution determining unit 211 determines that the resolution table 204 fails to record the pull-print MFP 10A, the resolution determining unit 211 records the pull-print MFP 10A, the pull-print resolution, and the information processing ability of the pull-print MFP 10A, in association with each other, in the resolution table 204.

The table reset unit 213 of the server apparatus 20 resets the resolution table 204 at certain timing to thereby delete the information recorded in the resolution table 204.

6. Operation of Information Processing System

Figure 5:
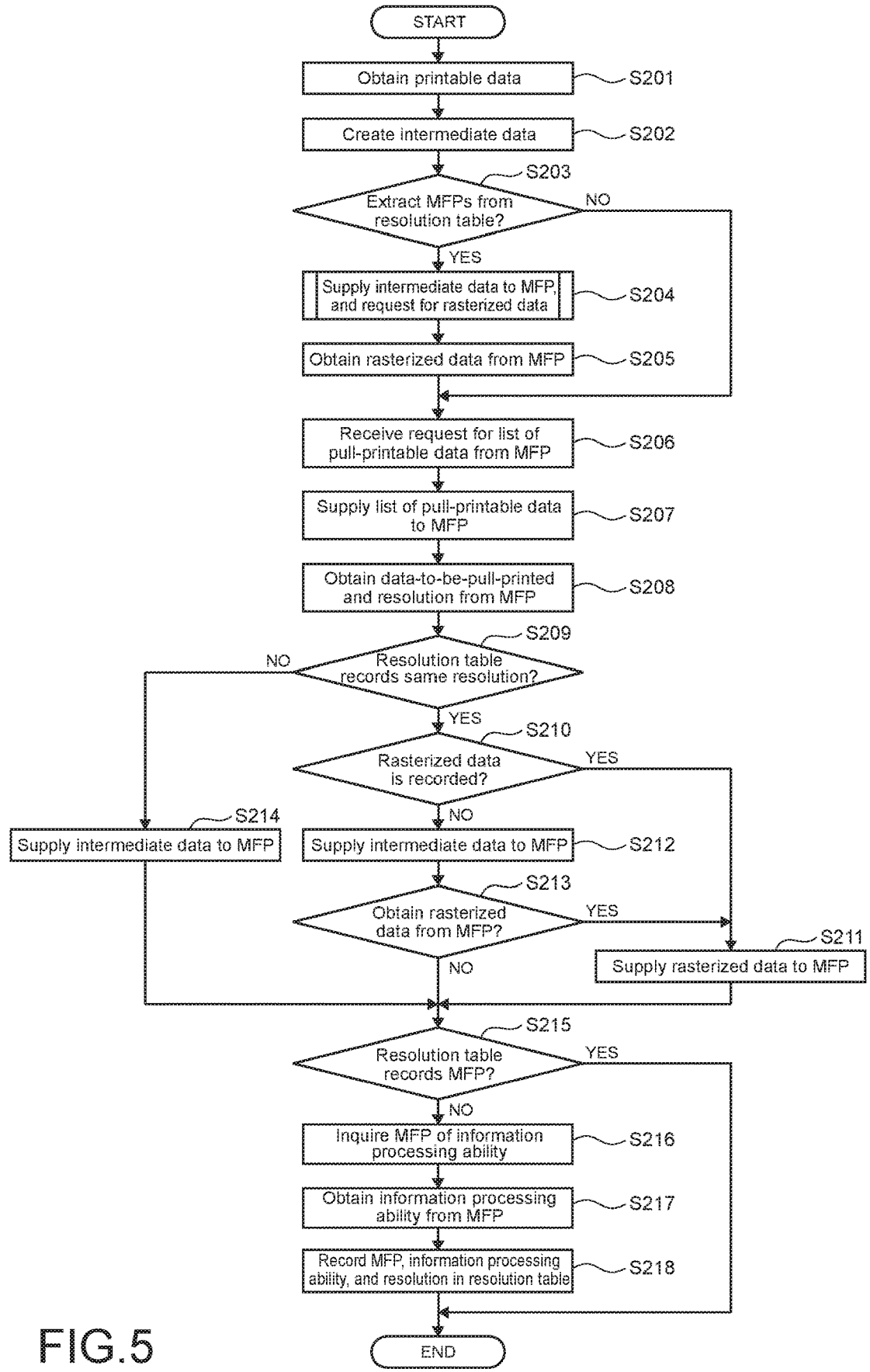
FIG. 5 An operational flow of the server apparatus.
Figure 6:
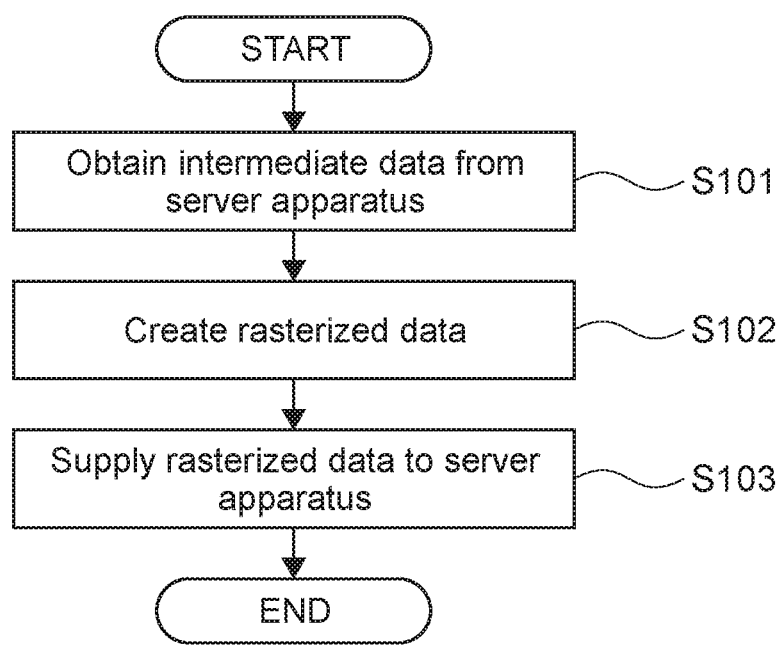
FIG. 6 An operational flow of the image forming apparatus.
Figure 7:
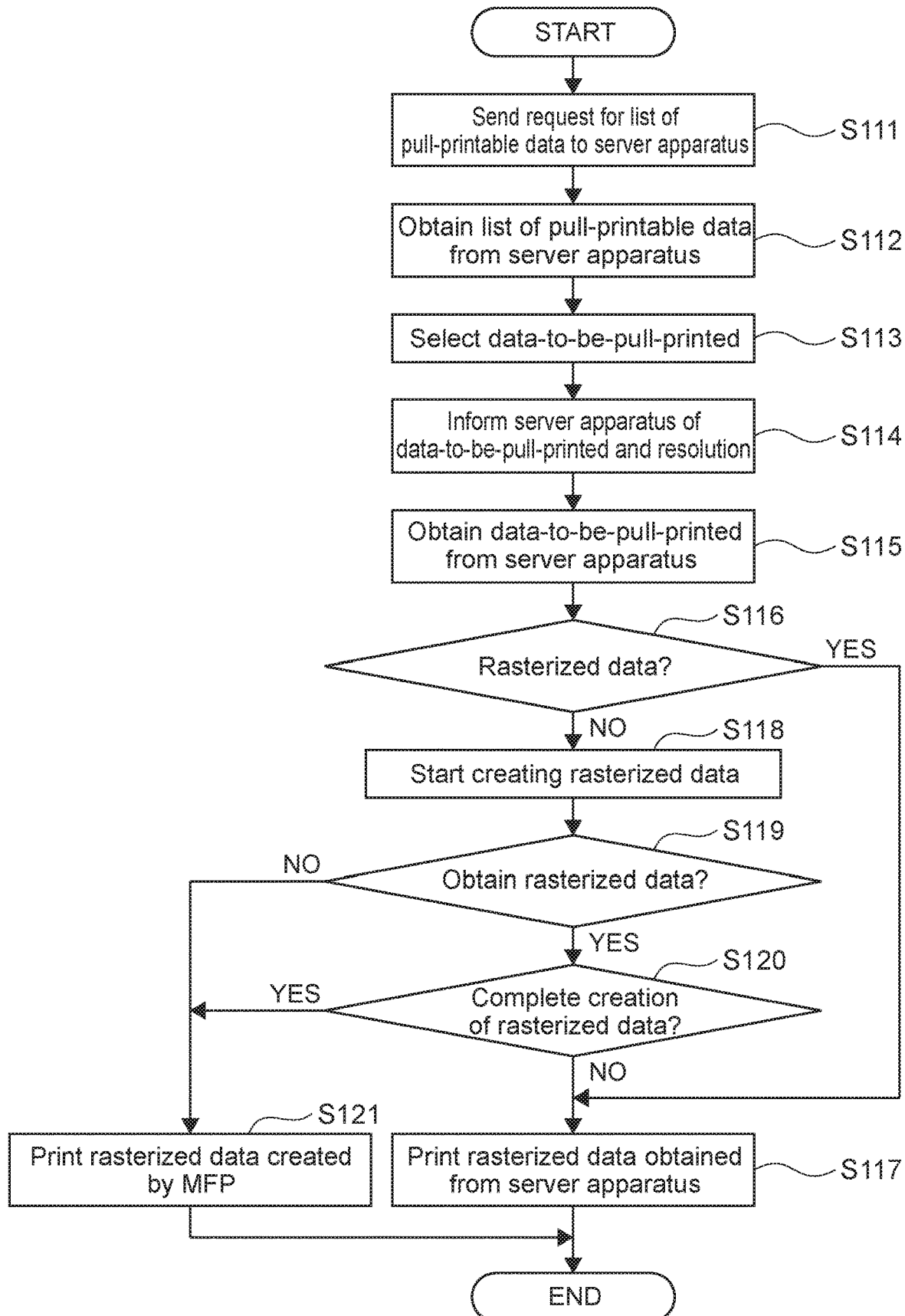
FIG. 7 An operational flow of the image forming apparatus that executes pull-printing.
Figure 8:
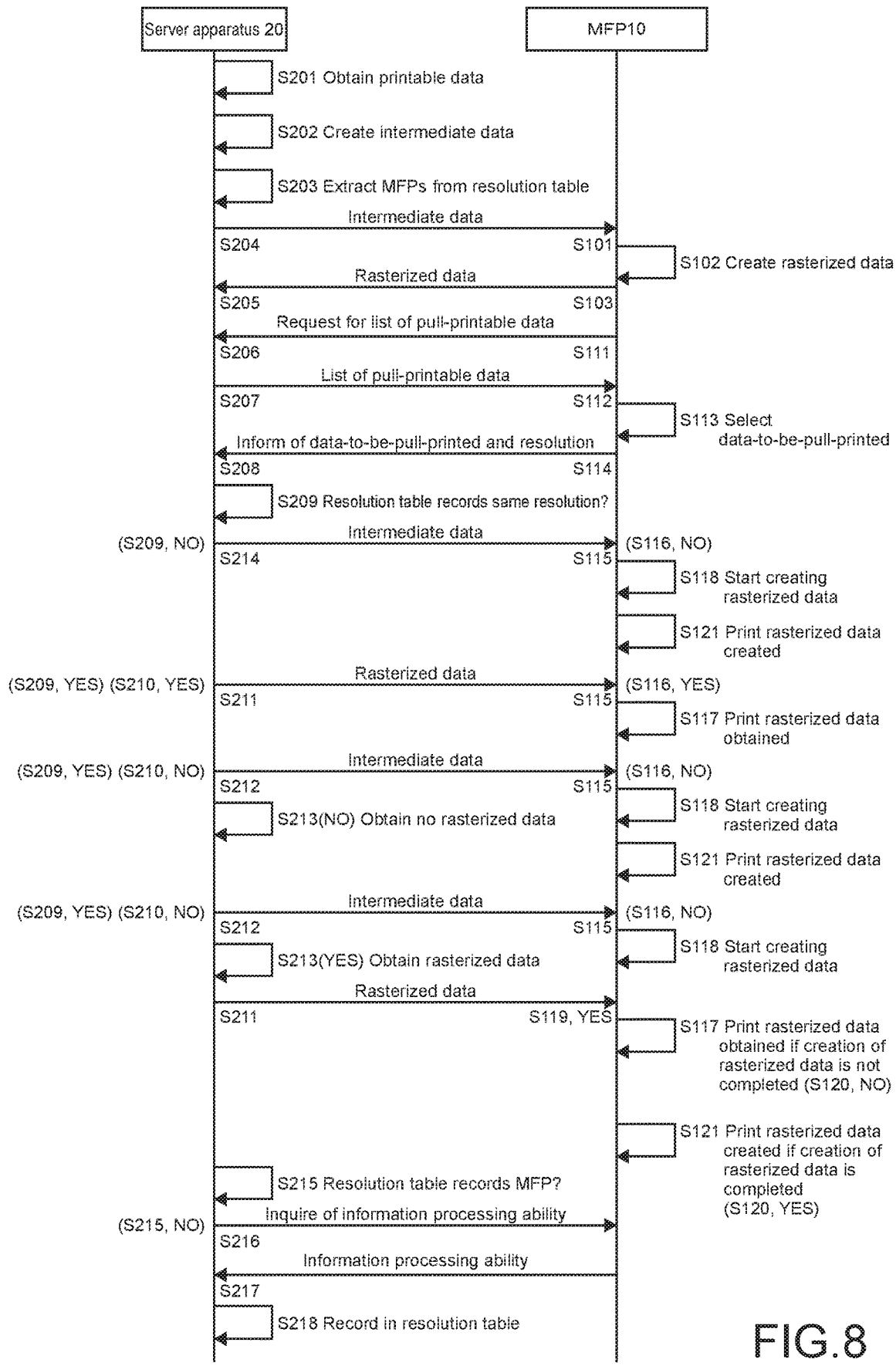
FIG. 8 An operational sequence of the information processing system.

FIG. 5 shows an operational flow of the server apparatus. FIG. 6 shows an operational flow of the image forming apparatus. FIG. 7 shows an operational flow of the image forming apparatus that executes pull-printing. FIG. 8 shows an operational sequence of the information processing system.

In the present embodiment, the respective resolutions are the following values.

Resolution of the MFP 10A: 600 dpi (dots per inch)
Resolution of the MFP 10B: 1200 dpi
Resolution of the MFP 10C: 600 dpi
Resolution described in printable data: 1200 dpi The terminal device 30 supplies printable data to the server apparatus 20 via the network N on a basis of a certain operation input by a user. The printable data describes the identifier information (name, etc.) of the printable data and the resolution (1200 dpi) which is used to print the printable data.

The printable data obtaining unit 201 of the server apparatus 20 obtains the printable data from the terminal device 30 via the network N (Step S201). The printable data obtaining unit 201 supplies the printable data obtained from the terminal device 30 to the intermediate data creating unit 202. The printable data obtaining unit 201 records a list of the identifier information (name, etc.) of the printable data obtained from the terminal device 30, as a list of pull-printable data, in the pull-print list storage area 208.

The intermediate data creating unit 202 of the server apparatus 20 interprets the printable data obtained from the printable data obtaining unit 201, and then creates intermediate data independent of a resolution (Step S202). The intermediate data describes the resolution (1200 dpi) which is used to print the intermediate data. The intermediate data creating unit 202 records the created intermediate data in the intermediate data storage area 206, and supplies the created intermediate data to the intermediate data supplying unit 203.

By the way, the resolution table 204 of the server apparatus 20 records, for each of different resolutions, the plurality of MFPs 10 (specifically, identifier information and address information (for example, IP address) of the plurality of MFPs 10), resolutions of the MFPs 10 respectively, and information processing abilities of the MFPs 10 respectively, in association with each other. The "information processing ability" includes, for example, specs of processing performance of each of the MFPs 10 or specs of processing performance of control elements of each of the MFPs 10. Further, the "information processing ability" may include, for example, a measured value of processing performance of each of the MFPs 10 or a measured value of processing performance of control elements of each of the MFPs 10. Further, the "information processing ability" may include, for example, a value calculated on a basis of specs or a measured value of processing performance of each of the MFPs 10 or a value calculated on a basis of specs or a measured value of processing performance of control elements of each of the MFPs 10. In this case, the "control elements" of each of the MFP 10 include one or a plurality of (a) processor(s) such as (a) CPU(s) or (a) memory (memories) configured to process (specifically, rasterize) an image. Further, for example, the "processing performance" of each of the MFPs 10 may be a print speed, the "processing performance" of a processor or an image processing circuit may be a processing speed or a clock rate, and the "processing performance" of a memory may be a storage volume. The MFPs 10 recorded in the resolution table 204 are the MFPs 10 connected to the network N to which the server apparatus 20 is connected. In the present example, the resolution table 204 records the MFPs 10A, 10B, and 10C, the resolutions (600 dpi, 1200 dpi, and 600 dpi) of the MFPs 10A, 10B, and 10C, and the information processing abilities of the MFPs 10A, 10B, and 10C, in association with each other. In other words, the resolution table 204 records one or a plurality of MFP(s) 10 for one kind of resolution. For example, the plurality of MFPs 10A and 10C having the same resolution (600 dpi) are connected to the network N. In this case, the resolution table 204 records the plurality of MFPs 10A and 10C for the resolution of 600 dpi. A method of recording the MFP 10, the resolution, and the information processing ability, in association with each other, in the resolution table 204 will be described later (Step S218 below).

The operational flow will be described again. The intermediate data supplying unit 203 of the server apparatus 20 obtains the intermediate data from the intermediate data creating unit 202. The intermediate data supplying unit 203 sends a request to select the MFP 10, to which the intermediate data is to be supplied, to the MFP selecting unit 214. The MFP selecting unit 214 refers to the resolution table 204, and extracts the MFPs 10A, 10B, and 10C corresponding to all the recorded identifier information (Step S203, YES). The MFP selecting unit 214 of the server apparatus 20 selects one MFP 10 for each of different resolutions on a basis of priority from the MFPs 10A, 10B, and 10C (FIG. 4 and FIG. 8 show only one MFP) recorded in the resolution table 204. The intermediate data supplying unit 203 supplies the intermediate data to the MFP 10 selected by the MFP selecting unit 214 (i.e., to the address information of the MFP 10 recorded in the resolution table 204) via the network N, and requests to create rasterized data on a basis of the intermediate data (Step S204). Now, a method of selecting one MFP 10 for each of the different resolutions on a basis of priority by the MFP selecting unit 214 will be described in detail. The "priority" depends on the information processing ability of each MFP, and depends on the fact that whether or not each MFP is capable of creating rasterized data immediately.

Figure 9:
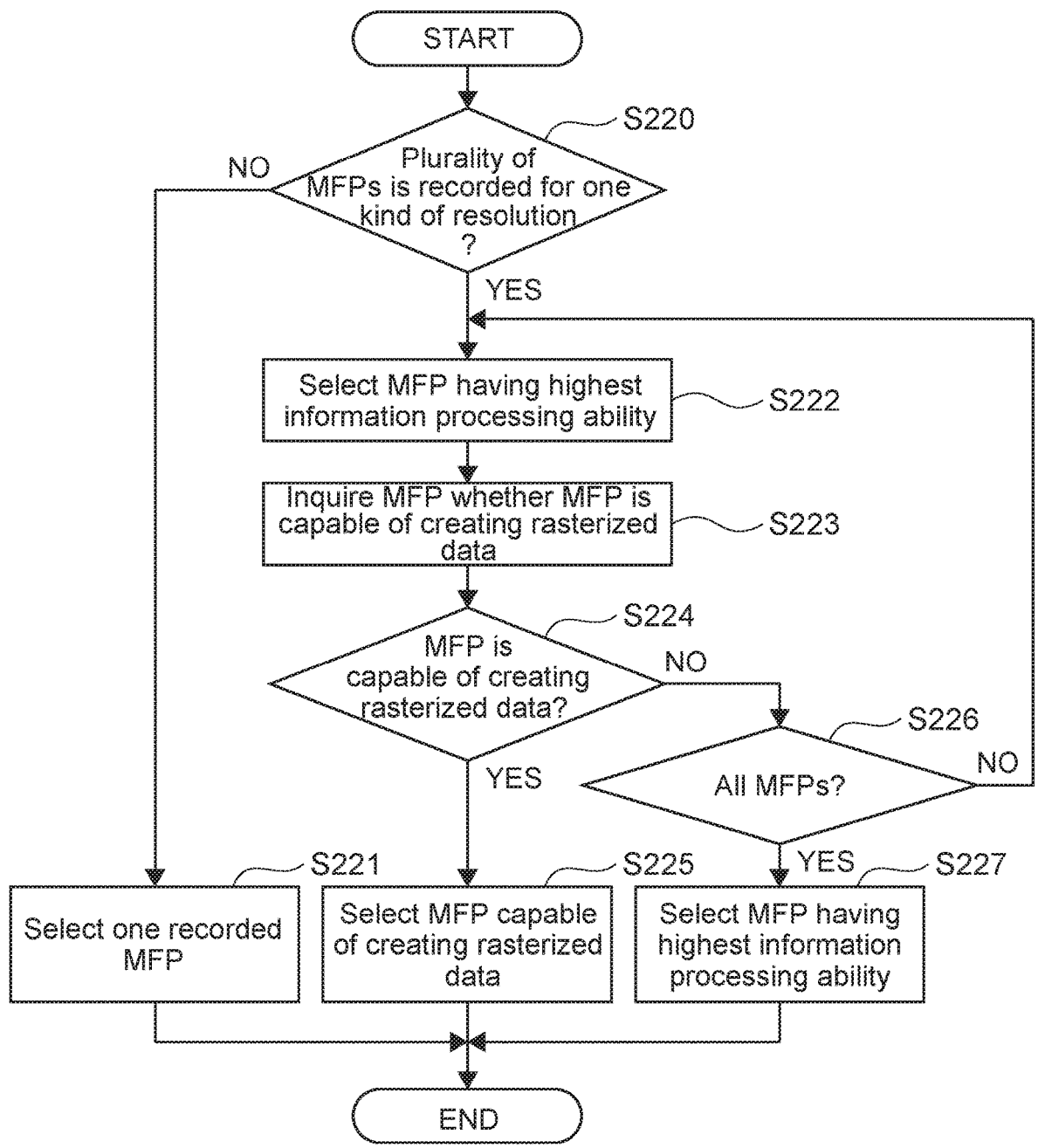
FIG. 9 An operational flow of the MFP selecting unit of the server apparatus.

FIG. 9 shows an operational flow of the MFP selecting unit of the server apparatus.

The MFP selecting unit 214 of the server apparatus 20 determines whether one MFP 10 is recorded or a plurality of MFPs 10 is recorded for one certain kind of resolution in the resolution table 204 (Step S220). The MFP selecting unit 214 determines that one MFP 10 is recorded for one certain kind of resolution in the resolution table 204 (Step S220, NO). Then the MFP selecting unit 214 selects the one MFP 10 as a destination to which the intermediate data is to be supplied (Step S221). In the present example, the MFP selecting unit 214 determines that one MFP 10B is recorded for the resolution 1200 dpi in the resolution table 204 (Step S220, NO). Then the MFP selecting unit 214 selects the one MFP 10B as a destination to which the intermediate data is to be supplied (Step S221).

Meanwhile, the MFP selecting unit 214 may alternatively determine that a plurality of MFPs 10 is recorded for one certain kind of resolution in the resolution table 204 (Step S220, YES). In the present example, the MFP selecting unit 214 determines that the MFPs 10A and 10C are recorded for the resolution of 600 dpi in the resolution table 204. Then the MFP selecting unit 214 refers to the information processing abilities of the respective MFPs 10 recorded in the resolution table 204, and selects one MFP 10 (10A or 10C) having the highest information processing ability (Step S222). The MFP selecting unit 214 inquires, via the network N, the MFP 10 having the highest information processing ability whether or not the MFP 10 is capable of immediately creating rasterized data (Step S223).

The rasterization responding unit 104 of the MFP 10 determines whether or not the rasterized data creating unit 102 is executing a job (print job, etc.) including creating rasterized data. If the rasterized data creating unit 102 is not executing a job including creating rasterized data, the rasterization responding unit 104 determines that it is possible to create rasterized data immediately. Meanwhile, if the rasterized data creating unit 102 is executing a job including creating rasterized data, the rasterization responding unit 104 determines that it is not possible to create rasterized data immediately. The rasterization responding unit 104 responds the determination result to the server apparatus 20 via the network N.

The MFP selecting unit 214 of the server apparatus 20 obtains a response from the MFP 10 via the network N. If the MFP 10 is capable of creating rasterized data immediately (Step S224, YES), the MFP selecting unit 214 selects the selected MFP 10 (Step S222) as a destination to which the intermediate data is to be supplied (Step S225).

Meanwhile, if the MFP 10 is not capable of creating rasterized data immediately (Step S224, NO), the MFP selecting unit 214 selects one MFP 10 (10A or 10C) having the next highest information processing ability having the same resolution (1200 dpi) (Step S222), and executes the same processing (Step S223 and thereafter). However, if all the MFPs 10 having the same resolution registered in the resolution table 204 are not capable of creating rasterized data immediately (Step S224, NO, and S226, YES), the MFP selecting unit 214 selects the MFP 10 having the highest information processing ability and having the same resolution (1200 dpi) recorded in the resolution table 204 as a destination to which the intermediate data is to be supplied (Step S227).

The intermediate data supplying unit 203 of the server apparatus 20 supplies intermediate data to the MFP 10 selected as described above by the MFP selecting unit 214 via the network N, and requests the MFP 10 to create rasterized data on a basis of the intermediate data (Step S204).

In other words, before the pull-print receiving unit 210 receives a pull-print request from the pull-print MFP 10A (Step S208 below), the intermediate data creating unit 202 creates intermediate data (Step S202). Further, before the pull-print receiving unit 210 receives a pull-print request from the pull-print MFP 10A (Step S208 below), the intermediate data supplying unit 203 supplies the intermediate data to one MFP 10 (in the present example, the MFP 10A or 10C of 600 dpi, the MFP 10B of 1200 dpi) for each of the different resolutions recorded in the resolution table 204, and requests to create rasterized data on a basis of the intermediate data (Step S204).

The intermediate data obtaining unit 101 of the MFP 10 obtains the intermediate data from the server apparatus 20 via the network N, and receives the request to create rasterized data on a basis of the intermediate data (Step S101). The intermediate data obtaining unit 101 supplies the obtained intermediate data to the rasterized data creating unit 102.

The rasterized data creating unit 102 of the MFP 10 obtains the intermediate data from the intermediate data obtaining unit 101, and then creates rasterized data on a basis of the obtained intermediate data (which describes resolution of 1200 dpi), the rasterized data depending on the resolution of the MFP 10 (Step S102). Specifically, the rasterized data creating unit 102 of the MFP 10A or 10C (resolution of 600 dpi) creates rasterized data of 600 dpi on a basis of the intermediate data. The rasterized data creating unit 102 of the MFP 10B (resolution of 1200 dpi) creates rasterized data of 1200 dpi on a basis of the intermediate data. Note that an MFP (not shown) having a resolution (for example, 2400 dpi) higher than the resolution (1200 dpi) described in the intermediate data may create rasterized data having the resolution (1200 dpi) described in the intermediate data. The rasterized data creating unit 102 of the MFP 10 supplies the created rasterized data to the rasterized data supplying unit 103.

The rasterized data supplying unit 103 of the MFP 10 supplies the rasterized data created by the rasterized data creating unit 102 to the server apparatus 20 via the network N (Step S103). Specifically, the rasterized data supplying unit 103 of the MFP 10A or 10C supplies the rasterized data of 600 dpi to the server apparatus 20. The rasterized data supplying unit 103 of the MFP 10B supplies the rasterized data of 1200 dpi to the server apparatus 20.

The rasterized data obtaining unit 205 of the server apparatus 20 obtains a plurality of rasterized data depending on the resolutions of the MFPs 10 from one MFP 10 (in the present example, the MFP 10A or 10C of 600 dpi, and the MFP 10B of 1200 dpi) for each of different resolutions recorded in the resolution table 204, via the network N (Step S205). The rasterized data obtaining unit 205 records the rasterized data depending on the different resolutions obtained from the MFP 10 in the rasterized data storage area 209. Specifically, the rasterized data obtaining unit 205 obtains the rasterized data of 600 dpi from the MFP 10A or 10C, and obtains the rasterized data of 1200 dpi from the MFP 10B. The rasterized data obtaining unit 205 records the rasterized data of 600 dpi obtained from the MFP 10A or 10C and the rasterized data of 1200 dpi obtained from the MFP 10B in the rasterized data storage area 209.

Note that the rasterized data obtaining unit 205 of the server apparatus 20 obtains the rasterized data from the MFPs 10 not always immediately (i.e., before Step S206 described below) (Step S205). According to one example case, the MFP selecting unit 214 selects a (busy) MFP 10, which is not capable of creating rasterized data immediately, as a destination to which the intermediate data is to be supplied (Step S227). In this case, the rasterized data obtaining unit 205 of the server apparatus 20 may possibly obtain the rasterized data from the MFP 10 after Step S206 (described below). Processing in such a case will be described later (Step S210 below).

A user operates an MFP 10, and logs in to one MFP 10 as an MFP (pull-print MFP) that executes pull-printing. In the present example, the pull-print MFP is the MFP 10A having the pull-print resolution of 600 dpi. Note that the pull-print MFP may be an MFP recorded in the resolution table 204 as in the present example or may not be an MFP recorded in the resolution table 204, which does not matter. The pull-print MFP 10A detects a certain operation input in the operation device 17 by the user, and then starts the pull-print process.

The pull-print start unit 111 of the pull-print MFP 10A sends a request for a list of pull-printable data to the server apparatus 20 via the network N (sends a request signal) (Step S111). Here, the request signal, which the pull-print start unit 111 of the pull-print MFP 10A sends to the server apparatus 20 to request for a list of pull-printable data, includes the identifier information and the address information (for example, IP address) of the pull-print MFP 10A.

The pull-print list supplying unit 207 of the server apparatus 20 receives the request for a list of pull-printable data from the pull-print MFP 10A via the network N (receives the request signal) (Step S206). The pull-print list supplying unit 207 reads the list of pull-printable data from the pull-print list storage area 208.

The pull-print list supplying unit 207 supplies the list of pull-printable data to the pull-print MFP 10A via the network N (i.e., to the address information included in the request signal from the pull-print MFP 10A) (Step S207).

The pull-print start unit 111 of the pull-print MFP 10A obtains the list of pull-printable data from the server apparatus 20 via the network N (Step S112). The pull-print start unit 111 displays the identifier information (name, etc.) of the data included in the list of pull-printable data on the display device 17a, for example, to thereby present the identifier information to the user.

The user refers to the identifier information (name, etc.) of the pull-printable data displayed on the display device 17a, operates the operation device 17, and selects the identifier information of pull-printable data.

The pull-print start unit 111 of the pull-print MFP 10A selects the identifier information of the data-to-be-pull-printed on a basis of a certain operation input in the operation device 17 by a user (Step S113). The pull-print start unit 111 informs the pull-print data obtaining unit 112 of the selected identifier information.

The pull-print data obtaining unit 112 of the pull-print MFP 10A obtains the identifier information of the data-to-be-pull-printed from the pull-print start unit 111. The pull-print data obtaining unit 112 of the pull-print MFP 10A informs the server apparatus 20 of the identifier information of the data-to-be-pull-printed and the pull-print resolution (600 dpi) of the pull-print MFP 10A via the network N (Step S114).

The pull-print receiving unit 210 of the server apparatus 20 receives the pull-print request from the pull-print MFP 10A via the network N. Specifically, the pull-print receiving unit 210 receives the pull-print request, and thereby obtains the identifier information of the data-to-be-pull-printed and the pull-print resolution (600 dpi) of the selected pull-print MFP 10A (Step S208). The pull-print receiving unit 210 informs the resolution determining unit 211 of the pull-print resolution (600 dpi).

The resolution determining unit 211 of the server apparatus 20 receives the information of the pull-print resolution (600 dpi) from the pull-print receiving unit 210. The resolution determining unit 211 determines whether or not the resolution table 204 records the resolution that is the same as the pull-print resolution (600 dpi) in the plurality of recorded different resolutions (Step S209). The resolution determining unit 211 informs the pull-print data supplying unit 212 of whether or not the resolution that is the same as the pull-print resolution (600 dpi) is recorded.

The fact that the resolution that is the same as the pull-print resolution is recorded in the resolution table 204 means that the rasterized data depending on the resolution that is the same as the pull-print resolution (Step S205) is recorded in the rasterized data storage area 209 (or is to be obtained and recorded later). Meanwhile, the fact that the resolution that is the same as the pull-print resolution is not recorded in the resolution table 204 means that the rasterized data depending on the resolution that is the same as the pull-print resolution (Step S205) is not recorded in the rasterized data storage area 209 (in addition, is not to be obtained and not to be recorded later).

In the present example, the resolution table 204 records the MFPs 10A, 10B, and 10C having the different resolutions, the different resolutions (600 dpi, 1200 dpi, and 600 dpi), and the information processing abilities of the MFPs 10, in association with each other. So the resolution determining unit 211 determines that the resolution that is the same as the pull-print resolution (600 dpi) is recorded as one of the plurality of different resolutions recorded in the resolution table 204 (Step S209, YES). The resolution determining unit 211 informs the pull-print data supplying unit 212 of the fact that it is determined that the resolution that is the same as the pull-print resolution is recorded in the resolution table 204.

The pull-print data supplying unit 212 of the server apparatus 20 receives the information, which indicates that the resolution that is the same as the pull-print resolution is recorded in the resolution table 204, from the resolution determining unit 211. Then the pull-print data supplying unit 212 determines, with regard to the data-to-be-printed corresponding to the identifier information obtained from the pull-print MFP 10A, whether or not rasterized data depending on the resolution that is the same as the resolution (600 dpi) of the pull-print MFP 10A is already obtained (Step S205) and is recorded in the rasterized data storage area 209 (Step S210). If rasterized data depending on the resolution that is the same as the resolution (600 dpi) of the pull-print MFP 10A is recorded in the rasterized data storage area 209 (Step S210, YES), the pull-print data supplying unit 212 reads the rasterized data from the rasterized data storage area 209. The pull-print data supplying unit 212 supplies the read rasterized data to the pull-print MFP 10A via the network N (Step S211).

Meanwhile, if rasterized data depending on the resolution that is the same as the resolution (600 dpi) of the pull-print MFP 10A is not yet recorded in the rasterized data storage area 209 (Step S210, NO), the pull-print data supplying unit 212 reads the intermediate data from the intermediate data storage area 206. The pull-print data supplying unit 212 supplies the read intermediate data to the pull-print MFP 10A via the network N (Step S212).

Note that, if the resolution table 204 records the resolution that is the same as the pull-print resolution (600 dpi) (Step S209, YES), after the MFP 10 (resolution same as pull-print resolution), which has obtained the intermediate data, gets to be in an un-busy status, then the MFP 10 should create rasterized data on a basis of the obtained intermediate data and supply the rasterized data to the server apparatus 20. In view of that, if the rasterized data obtaining unit 205 of the server apparatus 20 obtains rasterized data from the MFP 10 within a predetermined time period thereafter (Step S213, YES), the pull-print data supplying unit 212 supplies the obtained rasterized data to the pull-print MFP 10A via the network N (Step S211).

Meanwhile, the resolution determining unit 211 of the server apparatus 20 determines that the resolution table 204 fails to record the resolution that is the same as the pull-print resolution (Step S209, NO). The resolution determining unit 211 informs the pull-print data supplying unit 212 of the fact that the resolution determining unit 211 determines that the resolution table 204 fails to record the resolution that is the same as the pull-print resolution. The pull-print data supplying unit 212 receives the information, which indicates that the resolution that is the same as the pull-print resolution is not recorded in the resolution table 204, from the resolution determining unit 211. Then the pull-print data supplying unit 212 reads, from the intermediate data storage area 206, the intermediate data of the data-to-be-printed corresponding to the identifier information obtained from the pull-print MFP 10A. The pull-print data supplying unit 212 supplies the read intermediate data to the pull-print MFP 10A via the network N (Step S214).

The pull-print data obtaining unit 112 of the pull-print MFP 10A obtains the data-to-be-pull-printed from the server apparatus 20 via the network N (Step S115). If the pull-print data obtaining unit 112 obtains the rasterized data (Step S116, YES), the pull-print data obtaining unit 112 supplies the rasterized data to the pull-print executing unit 113. Specifically, the obtained data is the rasterized data depending on the resolution that is the same as the resolution (600 dpi) of the pull-print MFP 10A.

The pull-print executing unit 113 of the pull-print MFP 10A obtains the rasterized data from the pull-print data obtaining unit 112. The pull-print executing unit 113 outputs the rasterized data, which is obtained by the pull-print data obtaining unit 112 from the server apparatus 20, to the image forming device 16, and causes the image forming device 16 to print the rasterized data (Step S117).

Meanwhile, if the pull-print data obtaining unit 112 of the pull-print MFP 10A obtains the intermediate data (Step S116, NO), the pull-print data obtaining unit 112 supplies the intermediate data to the pull-print executing unit 113.

The pull-print executing unit 113 of the pull-print MFP 10A obtains the intermediate data from the pull-print data obtaining unit 112. The pull-print executing unit 113 supplies the obtained intermediate data to the rasterized data creating unit 102.

The rasterized data creating unit 102 of the pull-print MFP 10A starts creating rasterized data depending on the resolution of the MFP 10A on a basis of the intermediate data obtained from the pull-print executing unit 113 (Step S118).

After the rasterized data creating unit 102 starts creating rasterized data, the pull-print data obtaining unit 112 of the pull-print MFP 10A may possibly obtain rasterized data from the server apparatus 20 via the network N (Step S119, YES). This is a case where the MFP 10 (which has the resolution that is the same as the resolution of the pull-print MFP), which was in the busy status, then creates rasterized data and supplies the rasterized data to the server apparatus 20, and the server apparatus 20 supplies the obtained rasterized data to the pull-print MFP 10A. In this case, if the rasterized data creating unit 102 of the pull-print MFP 10A is yet to complete creation of rasterized data (Step S120, NO), the pull-print executing unit 113 outputs the rasterized data, which is obtained from the server apparatus 20 (Step S119, YES), to the image forming device 16, and causes the image forming device 16 to print the rasterized data (Step S117).

Meanwhile, the pull-print data obtaining unit 112 of the pull-print MFP 10A does not obtain rasterized data from the server apparatus 20 (Step S119, NO). Alternatively, the pull-print data obtaining unit 112 obtains rasterized data from the server apparatus 20 (Step S119, YES), but the rasterized data creating unit 102 has completed creation of rasterized data before that (Step S120, YES). In those cases, the rasterized data creating unit 102 of the pull-print MFP 10A supplies the created rasterized data (Step S118) to the pull-print executing unit 113.

The pull-print executing unit 113 of the pull-print MFP 10A obtains the rasterized data, which is created by the rasterized data creating unit 102, from the rasterized data creating unit 102. The pull-print executing unit 113 outputs the rasterized data, which is created by the rasterized data creating unit 102, to the image forming device 16, and causes the image forming device 16 to print the rasterized data (Step S121).

Meanwhile, the resolution determining unit 211 of the server apparatus 20 determines whether or not the resolution table 204 records the pull-print MFP 10A (Step S215). If the resolution table 204 fails to record the pull-print MFP 10A (Step S215, NO), the resolution determining unit 211 inquires the pull-print MFP 10A via the network N of the information processing ability (Step S216). The information processing ability responding unit 114 of the pull-print MFP 10A responds the information processing ability of the pull-print MFP 10A to the server apparatus 20 via the network N. The resolution determining unit 211 of the server apparatus 20 obtains the information processing ability from the pull-print MFP 10A via the network N (Step S217).

The resolution determining unit 211 records the pull-print MFP 10A, the obtained information processing ability, and the pull-print resolution, in association with each other, in the resolution table 204 (Step S218). Specifically, the resolution determining unit 211 records the identifier information and the address information (for example, IP address) of the pull-print MFP 10A, the information processing ability, and the pull-print resolution, in association with each other, in the resolution table 204. The identifier information and the address information of the pull-print MFP 10A are included in the request signal received by the pull-print list supplying unit 207 in Step S206.

Note that the server apparatus 20 may include the table reset unit 213. The table reset unit 213 resets the resolution table 204 at certain timing to thereby delete the information recorded in the resolution table 204. For example, the "certain timing" means periodic timing, or timing based on a certain trigger. As a result, the resolution table 204 is updated every certain timing.

If the resolution table 204 is reset, for example, and information recorded in the resolution table 204 is deleted, then the intermediate data supplying unit 203 extracts no MFP recorded in the resolution table 204 (Step S203, NO). In this case, the server apparatus 20 stands by until the server apparatus 20 receives a request for a list of pull-printable data from the pull-print MFP 10A via the network N (Step S206).

7. Conclusion

According to a typical pull-print art, when an image forming apparatus executes pull-printing, the image forming apparatus obtains intermediate data from a server apparatus, creates rasterized data on a basis of the obtained intermediate data, and forms an image on a basis of the created rasterized data.

For example, according to Patent Literature 1, an MFP prints original data independent of a resolution under a certain condition. However, in this case, the MFP has to create rasterized data depending on a resolution every time the MFP prints data. It takes time to create rasterized data and, as a result, it takes time to form an image.

To the contrary, according to the aforementioned embodiment, before the server apparatus 20 receives the pull-print request from the pull-print MFP 10A (Step S208), the server apparatus 20 creates intermediate data (Step S202), supplies the intermediate data to one MFP 10 having each of different resolutions selected from the plurality of MFPs 10 recorded in the resolution table 204, and requests to create rasterized data on a basis of the intermediate data (Step S204). As a result, the server apparatus 20 is highly likely to obtain the rasterized data depending on the resolution of the pull-print MFP 10A (Step S205) before the server apparatus 20 receives the pull-print request from the pull-print MFP 10A (Step S208).

As a result, as soon as the server apparatus 20 receives the pull-print request from the pull-print MFP 10A (Step S208), the server apparatus 20 is capable of immediately supplying the rasterized data depending on the resolution of the pull-print MFP 10A to the pull-print MFP 10A (Step S211). As a result, the pull-print MFP 10A only has to print the rasterized data obtained from the server apparatus 20 (Step S117). So it is possible to omit the step of creating rasterized data by an MFP on a basis of intermediate data obtained from a server apparatus. Therefore, according to the present embodiment, it is possible to execute pull-printing in a shorter time than that of a typical pull-printing art, which includes the step of creating rasterized data by an MFP on a basis of intermediate data obtained from a server apparatus.

Meanwhile, if the resolution table 204 fails to record the resolution of the pull-print MFP 10A (Step S209, NO), the server apparatus 20 has no choice to supply the intermediate data to the pull-print MFP 10A (Step S214). However, the server apparatus 20 records the pull-print MFP 10A, the pull-print resolution, and the information processing ability of the pull-print MFP 10A, in association with each other, in the resolution table 204 (Step S218). As a result, if the server apparatus 20 receives a pull-print request from an MFP having the resolution that is the same as the resolution of the pull-print MFP 10A the next time (Step S208), the server apparatus 20 should have obtained the rasterized data created by the pull-print MFP 10A (Step S205). As a result, the server apparatus 20 is capable of supplying the rasterized data depending on the pull-print resolution to a pull-print MFP the next time and thereafter (Step S211).

Further, according to the present embodiment, the MFP selecting unit 214 of the server apparatus 20 selects one MFP 10 having the highest information processing ability for each of the different resolutions from the plurality of MFPs 10 recorded in the resolution table 204 (Step S222). If the MFP 10 having the highest information processing ability is not capable of creating rasterized data immediately (Step S224, NO), the MFP selecting unit 214 selects one MFP 10 having the next highest information processing ability (Step S227). As a result, jobs including creating rasterized data are not likely to concentrate on one MFP 10 having the highest information processing ability.

As a result, the processing of creating rasterized data is not likely to concentrate on the MFP 10 having the highest information processing ability. If a plurality of pull-printing processing is executed simultaneously, it is possible to distribute the processing of creating rasterized data to the plurality of MFPs 10. As a result, the server apparatus 20 is capable of obtaining rasterized data from the MFP 10 having the next highest information processing ability faster than a case where the MFP 10 having the highest information processing ability is caused to create rasterized data every time. In addition, it is possible to prevent the performance of the entire information processing system 1 from decreasing.

Further, according to the present embodiment, if the server apparatus 20 supplies the intermediate data to the pull-print MFP 10A (Step S212) and then obtains the rasterized data from the MFP 10 (Step S213, YES), then the server apparatus 20 supplies the obtained rasterized data to the pull-print MFP 10A (Step S211). If the pull-print MFP 10A obtains the intermediate data from the server apparatus 20 (Step S116, NO) and then obtains the rasterized data from the server apparatus 20 (Step S119, YES), then the pull-print MFP 10A prints the obtained rasterized data (Step S117) if the pull-print MFP 10A is yet to complete creation of rasterized data (Step S120, NO).

Therefore the pull-print MFP 10A prints the rasterized data obtained from the server apparatus 20 before creation of rasterized data. So it is possible to execute printing faster than a case where printing is executed after completion of creation of rasterized data.

Further, according to Patent Literature 2, a server obtains model information (manufacture number) of an image forming apparatus, creates image data depending on a resolution based on the model information, and supplies the image data to the image forming apparatus. Since the server manages model information and a resolution in association with each other, the server has to keep on updating model information every time a new model is released.

To the contrary, according to the aforementioned embodiment, the server apparatus 20 includes the resolution table 204 that records the plurality of MFPs 10, resolutions of the MFPs 10 respectively, and information processing abilities of the MFPs 10 respectively, in association with each other, for each of different resolutions. As a result, without storing model information in the server apparatus 20, the pull-print MFP 10 is capable of appropriately obtaining rasterized data depending on the pull-print resolution.

It should be understood by those skilled in the art that various modifications, combinations, sub-combinations and alterations may occur depending on design requirements and other factors insofar as they are within the scope of the appended claims or the equivalents thereof.

What is claimed is:

1. A server apparatus, comprising:
a storage device configured to store a resolution table, the resolution table being configured to record a plurality of image forming apparatuses having different resolutions, the resolutions of the image forming apparatuses respectively, and information processing abilities of the image forming apparatuses respectively, in association with each other;
a memory configured to store an information processing program; and
a processor configured to execute the information processing program,
the processor being configured to execute the information processing program to operate as a printable data obtaining unit configured to obtain printable data from a terminal device, an intermediate data creating unit configured to create intermediate data on a basis of the printable data, the intermediate data being independent of resolution, an image forming apparatus selecting unit configured to select one image forming apparatus having each of the different resolutions on a basis of priority from the plurality of image forming apparatuses recorded in the resolution table, an intermediate data supplying unit configured to supply the intermediate data to the plurality of image forming apparatuses selected, a rasterized data obtaining unit configured to obtain a plurality of rasterized data depending on the different resolutions respectively, the plurality of rasterized data being created by the plurality of image forming apparatuses on a basis of the intermediate data, a pull-print receiving unit configured to receive a pull-print request from a pull-print image forming apparatus and obtain a pull-print resolution, the pull-print image forming apparatus being an image forming apparatus that executes pull-printing, the pull-print resolution being a resolution of the pull-print image forming apparatus, a resolution determining unit configured to determine whether or not the resolution table records a resolution that is same as the pull-print resolution, and a pull-print data supplying unit configured to supply rasterized data depending on the resolution that is same as the pull-print resolution to the pull-print image forming apparatus.

2. The server apparatus according to claim 1, wherein the image forming apparatus selecting unit is configured to select one image forming apparatus having a highest information processing ability for each of the different resolutions from the plurality of image forming apparatuses recorded in the resolution table.

3. The server apparatus according to claim 2, wherein the image forming apparatus selecting unit is configured to determine whether or not the selected image forming apparatus is capable of creating rasterized data, if the image forming apparatus selecting unit determines that the selected image forming apparatus is capable of creating rasterized data, supply the intermediate data to the selected image forming apparatus, and if the image forming apparatus selecting unit determines that the selected image forming apparatus is not capable of creating rasterized data, select one image forming apparatus having a next highest information processing ability and having same resolution.

4. The server apparatus according to claim 1, wherein
if the rasterized data obtaining unit is yet to obtain the rasterized data depending on the resolution that is same as the pull-print resolution, the pull-print data supplying unit is configured to supply the intermediate data to the pull-print image forming apparatus, and if, thereafter, the rasterized data obtaining unit obtains the rasterized data depending on the resolution that is same as the pull-print resolution, the pull-print data supplying unit is configured to supply the obtained rasterized data to the pull-print image forming apparatus.

5. The server apparatus according to claim 1, wherein
if the resolution determining unit determines that the resolution table fails to record the resolution that is same as the pull-print resolution, the pull-print data supplying unit is configured to supply the intermediate data to the pull-print image forming apparatus.

6. The server apparatus according to claim 5, wherein
the processor is configured to execute the information processing program to further operate as a table reset unit configured to reset the resolution table at certain timing.

7. The server apparatus according to claim 1, wherein
if the resolution determining unit determines that the resolution table fails to record the pull-print image forming apparatus, the resolution determining unit is configured to record the pull-print image forming apparatus, the pull-print resolution, and an information processing ability of the pull-print image forming apparatus, in association with each other, in the resolution table.

8. The server apparatus according to claim 1, wherein
after the printable data obtaining unit obtains the printable data and before the pull-print receiving unit receives the pull-print request, the intermediate data creating unit is configured to create intermediate data on a basis of printable data, the intermediate data being independent of a resolution, and the intermediate data supplying unit is configured to supply the intermediate data to the plurality of image forming apparatuses recorded in the resolution table.

9. An information processing system, comprising:
a plurality of image forming apparatuses having different resolutions; and a server apparatus, the server apparatus including a storage device configured to store a resolution table, the resolution table being configured to record the plurality of image forming apparatuses, the resolutions of the image forming apparatuses respectively, and information processing abilities of the image forming apparatuses respectively, in association with each other, a memory configured to store an information processing program, and a processor configured to execute the information processing program, the processor being configured to execute the information processing program to operate as a printable data obtaining unit configured to obtain printable data from a terminal device, an intermediate data creating unit configured to create intermediate data on a basis of the printable data, the intermediate data being independent of resolution, an image forming apparatus selecting unit configured to select one image forming apparatus having each of the different resolutions on a basis of priority from the plurality of image forming apparatuses recorded in the resolution table, an intermediate data supplying unit configured to supply the intermediate data to the plurality of image forming apparatuses selected, a rasterized data obtaining unit configured to obtain a plurality of rasterized data depending on the different resolutions respectively, the plurality of rasterized data being created by the plurality of image forming apparatuses on a basis of the intermediate data, a pull-print receiving unit configured to receive a pull-print request from a pull-print image forming apparatus and obtain a pull-print resolution, the pull-print image forming apparatus being an image forming apparatus that executes pull-printing, the pull-print resolution being a resolution of the pull-print image forming apparatus, a resolution determining unit configured to determine whether or not the resolution table records a resolution that is same as the pull-print resolution, and a pull-print data supplying unit configured to supply rasterized data depending on the resolution that is same as the pull-print resolution to the pull-print image forming apparatus.

10. An image forming apparatus, comprising:

a memory configured to store an information processing program; and a processor configured to execute the information processing program, the processor being configured to execute the information processing program to operate as an intermediate data obtaining unit configured to obtain intermediate data from a server apparatus, a rasterized data creating unit configured to create rasterized data on a basis of the intermediate data, the rasterized data depending on the resolution, and a rasterized data supplying unit configured to supply the rasterized data to the server apparatus, the server apparatus including a storage device configured to store a resolution table, the resolution table being configured to record a plurality of image forming apparatuses having different resolutions, the resolutions of the image forming apparatuses respectively, and information processing abilities of the image forming apparatuses respectively, in association with each other, a printable data obtaining unit configured to obtain printable data from a terminal device, an intermediate data creating unit configured to create intermediate data on a basis of the printable data, the intermediate data being independent of resolution, an image forming apparatus selecting unit configured to select one image forming apparatus having each of the different resolutions on a basis of priority from the plurality of image forming apparatuses recorded in the resolution table, an intermediate data supplying unit configured to supply the intermediate data to the plurality of image forming apparatuses selected, a rasterized data obtaining unit configured to obtain a plurality of rasterized data depending on the different resolutions respectively, the plurality of rasterized data being created by the plurality of image forming apparatuses on a basis of the intermediate data, a pull-print receiving unit configured to receive a pull-print request from a pull-print image forming apparatus and obtain a pull-print resolution, the pull-print image forming apparatus being an image forming apparatus that executes pull-printing, the pull-print resolution being a resolution of the pull-print image forming apparatus, a resolution determining unit configured to determine whether or not the resolution table records a resolution that is same as the pull-print resolution, and a pull-print data supplying unit configured to supply rasterized data depending on the resolution that is same as the pull-print resolution to the pull-print image forming apparatus.

* * * * *